Dec. 19, 1933.    N. V. HYBINETTE    1,940,172
CULINARY EQUIPMENT
Filed March 18, 1930
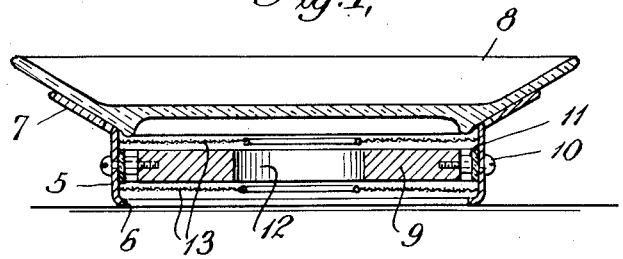
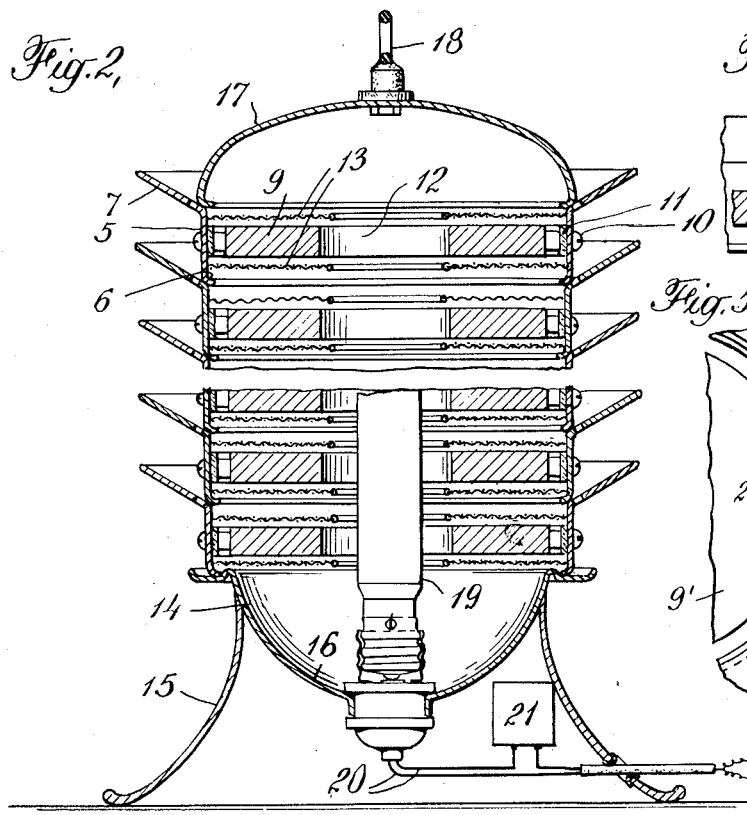
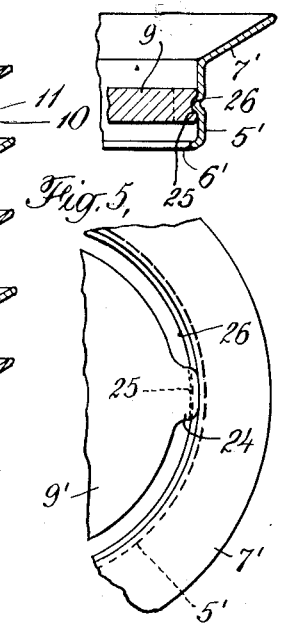
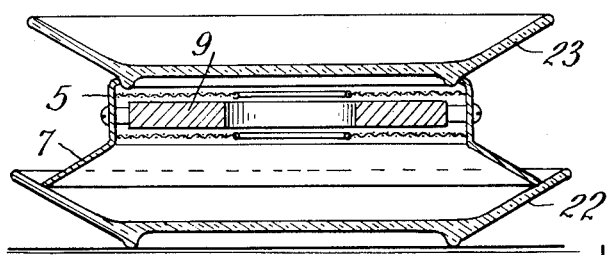
INVENTOR
Nork Victor Hybinette
BY
Pennie Davis Marvin Edmonds
ATTORNEYS Patented Dec. 19, 1933

1,940,172

UNITED STATES PATENT OFFICE 1,940,172

CULINARY EQUIPMENT

Noak Victor Hybinette, Wilmington, Del., assignor to The Nicralumin Company, Jackson, Mich., a corporation of Michigan Application March 18, 1930. Serial No. 436,770

8 Claims. (Cl. 219—19)

This invention relates to culinary equipment, and particularly to a device for heating dishes and food therein.

One of the most common annoyances in connection with the service and consumption of food in homes and hotels arises from the difficulty in keeping plates and other dishes at a suitable temperature. Cold dishes rapidly chill the food, which is served thereon, so that it often becomes unpalatable before it can be consumed. Hotels are commonly provided with heating closets, but dishes warmed therein lose their temperature rapidly in transit to the table. Various devices for heating plates and other dishes have been suggested, but all are unsatisfactory for various reasons.

It is the object of the present invention to provide a simple and satisfactory device which may be used in the kitchen and serving or dining room to heat or to maintain the temperature of dishes and food therein.

A further object of the invention is the provision of means whereby a plurality of the devices may be heated simultaneously and thus prepared for use.

The device of the present invention comprises a heat accumulator provided with suitable support, such as a supporting frame, and also provided with supports, or supporting means, such as the supporting frame, for supporting the plate or other dish to be heated. The accumulator itself is a mass of a suitable metal adapted to receive and accumulate heat and to transmit it primarily to the plate which is supported on the device. The accumulator may be made of various metals, but metals such as aluminum, silicon and magnesium or alloys thereof have a thermal capacity considerably above that of other metals. Consequently these materials are best adapted for the purpose of the invention. I prefer to employ ordinary commercial aluminum which has not only sufficient thermal capacity but also a desirable rate of heat transfer. This is also true of various aluminum alloys, and particularly alloys of aluminum with silicon and/or magnesium. The alloys may, however, contain considerable quantities of heavy metals such as iron, without destroying their efficiency for use in heat accumulators.

The accumulator itself is adapted and intended to be heated to a relatively high temperature, for example, around 300 or 400°, which is too high to permit it to be placed upon an ordinary table cloth and also too hot to place the flat portion of a plate directly on it. In order to obtain the advantage of having the accumulator itself at a high temperature, I provide it with a supporting frame, or with insulated supports, or other supports, which are adapted to rest upon the table and to support the accumulator element above the table, with an air space between, and I also provide the accumulator element with a frame or other support adapted to support a plate or other dish somewhat above the accumulator element so as to leave an air space between the accumulator element and the supported dish.

The supports for supporting the accumulator, and for supporting dishes on the accumulator, may vary in form and arrangement. Projections of an insulating character or composition, such as porcelain knobs, may be attached to the accumulator element for supporting it from the table and for supporting the dishes upon it; or metal supporting elements may be employed which are insulated from the accumulator elements so that they will be at a lower temperature.

The support for the accumulator which I consider particularly advantageous is a frame, preferably of metal, which may be polished and coated with any suitable material such as nickel or chromium or enamel, so that it will retain a pleasing appearance in service. The frame may be of any suitable shape, for example circular in case it is adapted for ordinary plates, or oval if intended to be used in connection with platters. The lower edge of the frame is intended to rest upon a table or other support, or when the devices are nested, upon the underlying device, and preferably the lower edge is continuous, so that when the devices are nested they form a chamber. Each device is provided preferably with an outwardly extending flange which may be disposed at an angle corresponding substantially to the usual formation of plates. The flange affords a support for the plate which is disposed on the device, and, because it projects into the atmosphere, it is normally cool and thus serves as a handle.

The device may be constructed in various sizes to accommodate plates and other dishes of different dimensions, and the heat accumulator in each device may be of suitable dimensions to accomplish the purpose of the invention. I find that a mass of ordinary aluminum or of a light aluminum alloy about five inches in diameter and one-half inch thick, weighing about one pound, will accumulate enough heat when raised to a temperature of 300° F. to keep an ordinary dinner plate hot or comfortably warm for at least thirty minutes. For larger dishes the size of the accumulator should be increased correspondingly.

To prevent inadvertent contact with the heated accumulator, I prefer to provide screens of light wire mesh in the device above and below the accumulator. I may also conveniently provide each accumulator with a central opening and so arrange them in the frames or supports that their peripheral edges are spaced from the frames. This arrangement prevents the rapid transfer of heat to the frame or supports and is particularly advantageous when the devices are nested. Heat may be applied beneath the nested devices, and the circulation of the heated air through the central openings and about the edges of the accumulators will ensure rapid heating of the accumulators to the desired temperature.

The heating may be accomplished by means of any convenient source of heat such as a gas flame or an electric heating element. I prefer to provide a support including a parabolic reflector with an electric heating element of the type commonly employed in reflector heaters disposed therein. The devices rest on this support in nested relation, and I provide a cover which may be also generally parabolic in shape, thus affording a closed chamber. The heating element may be connected to a source of current and the heat thus generated will rapidly raise the temperature of the accumulators to the required point. The devices may be removed then and utilized to heat or to maintain the temperature of plates and other dishes or to keep food on the dishes at a suitable temperature.

In order that overheating may be avoided, a suitable automatic switch can be installed in the connection between the heating element and the source of current. A timed switch having suitable clockwork may be employed, or a switch of the thermostatic variety may be used. Such switches are available in the market, and the details thereof form no part of the present invention.

In using the device after the accumulator has been raised to a suitable temperature, a plate or other dish which may have been previously warmed is disposed on the device, and the heat in the accumulator will be transmitted to the plate and to food thereon, maintaining the temperature thereof for relatively long periods, even though the plate and food are exposed to the atmosphere. The device may also be used as a spacer for plates covering food thereon, thus keeping the food in the underlying plate at a relatively high temperature and at the same time maintaining the temperature of the overlying plate and food thereon. Food may be kept at the required temperature in a stack of plates or dishes with interposed heat accumulators for extended periods.

The invention will be more clearly understood by reference to the accompanying specification and drawing, in which Fig. 1 is a sectional view of the device with a plate supported thereon;

Fig. 2 is a sectional view of a stack of the devices arranged in conjunction with an electric heater;

Fig. 3 is a sectional view of the device employed as a spacer to maintain the temperature of food in the plates below and above the accumulator;

Fig. 4 is a detail in section of a modified form of the device; and

Fig. 5 is a plan view of a portion of the device.

Referring to the drawing, 5 indicates a metal frame in the form of an annulus, having a lower edge 6 which is adapted to rest on a table or other support. An outwardly extending flange 7 is disposed at an angle and forms a handle for the device and a support for the plate 8 which rests thereon. The heat accumulator 9 comprises an annular mass of metal, for example aluminum or an alloy thereof with silicon and/or magnesium and/or other metals. The accumulator is supported on the frame in spaced relation thereto by a plurality of screws 10. A heat insulating band 11 may be disposed on the inner side of the frame to avoid the transfer of heat thereto. The heat accumulator 9 has preferably a central opening 12. Screens 13 of wire mesh are disposed above and below the accumulator and are fastened to the frame to avoid inadvertent contact with the accumulator and consequent burning of the hands or other materials.

A plurality of the devices may be nested as indicated in Fig. 2 and mounted on a support 14 having legs 15 and a reflector 16 generally parabolic in shape. A removable cover 17 with a handle 18 is supported on the nested devices to provide a closed chamber. A heating element 19 is provided. The heating element is preferably electrical, being provided with resistance wire (not shown) on a suitable insulating support. The standard "hair pin" element, consisting of a bent metal tube with a filling of magnesia in which the resistance wire is enclosed, may be used. It may be surrounded by any suitable heat radiating casing. The resistance wire is connected by conductors 20 to any suitable source of current, and an automatic switch 21 is disposed preferably in the circuit to shut off the current after a predetermined time and thus to prevent overheating of the heat accumulators. Preferably the heating element extends upwardly through the openings in the accumulators. I find it desirable, for example, if twelve accumulators are stacked, to extend the heating element through eight or nine. All of the accumulators are thus raised to an approximately uniform temperature. A shorter element may be used if fewer accumulators are to be heated. When the temperature of the accumulators has risen sufficiently, the device may be removed and utilized as in Fig. 1 to heat or maintain the temperature of plates and food thereon.

As indicated in Fig. 3, the device may be used as a spacer by inverting it over a plate 22 and then supporting another plate 23 thereon. In this case, heat radiates from the accumulator to the food on the plate 22 and the plate 23 is simultaneously warmed by the heat released from the accumulator. A number of plates and spacers may be assembled thus to form a stack in which food can be maintained at the desired temperature for considerable periods.

In Figs. 4 and 5, a modified form of the device is shown in which the accumulator 9' is provided with lugs 24 spaced about its periphery, the lugs having grooves 25 in their edges. The frame 5' with a lower edge 6' and a flange 7' has a peripheral bead 26 pressed inwardly when the parts are assembled to hold the accumulator. The latter is loosely held and can be rotated to dislodge any dirt which might catch between and to prevent water to enter so that the device may be kept in a sanitary condition.

The device is quite economical. I have found, for example, that with a heating apparatus as shown in Fig. 2, with an electric heater of 500 watts capacity, it is possible to heat a nest of twelve accumulators weighing about one pound each for approximately 30 minutes to the required temperature, for example about 300° F. Consequently the device may be used advantageously in homes and hotels to ensure the service of food at a satisfactory temperature. The device is not limited, however, to use with an electric heater, as the accumulator can be heated on an ordinary gas stove or with any gas flame.

The surfaces of the heat accumulators may be smooth or they may be corrugated or otherwise modified to affect the speed of heat transfer therefrom. They may be constructed either with or without a central opening, and in various sizes and shapes to meet special requirements.

The device is simple in construction and presents a pleasing appearance, particularly when the exposed metal frame is suitably decorated. It may be used, therefore, at the table and when so used ensures the most satisfactory service of food.

In the various forms of the device illustrated and described, the accumulator element is provided with supports which are so spaced or so arranged that they will be at a much lower temperature than the accumulator element itself. The accumulator can be heated to a high temperature, for example, around 300 to 400° F., while the supporting frame, or other support, will be at a much lower temperature. While a certain degree of heat transfer may take place by conduction and convection from the accumulator element to the supporting frame or other support, the spacing of the accumulator from the frame, or the provision of insulation, or the limited contact between the accumulator and frame, will permit the frame or other support to cool off more rapidly by radiation and they will also be less readily heated when the accumulator elements are heated. I consider it important to provide the accumulator elements with supports, either in the form of frames or in the form of other supports, which are of insulating material, such as knobs or projections, or which are insulated from the accumulator elements or which are spaced and so limited in their contact that the supports which come into contact with the table cloth do not heat the table cloth to an objectionably high temperature, and support the accumulator elements above the table cloth so as to leave an air space between them. So also, it is advantageous to have the accumulator itself supported in such a way that the plates which are in turn arranged above the accumulator element are spaced away from it and do not come into direct contact with it. The arrangement shown, with an air space between the accumulator element and the surrounding support, together with a central opening in the accumulator plate, permits circulation of air around the accumulator element and in contact with the bottom of the plate or other dish, thus tending to maintain a uniform temperature without objectionable local overheating.

While I have shown screens above and below the accumulator element, and while I consider these advantageous in many cases, they are not necessary and may be omitted in many cases.

The term "frame" as used in the accompanying claims contemplates any form of support for the heat accumulator.

Various changes may be made in the details of construction and the materials employed without departing from the invention or sacrificing any of the advantages thereof.

I claim:

1. A device of the character described comprising a frame and a heat accumulator supported at its side edges in the frame and in spaced relation to and between the planes of the upper and lower edges thereof.

2. A device of the character described comprising a frame having an outwardly and upwardly directed flange, and a heat accumulator having a central opening supported at its side edges in the frame and in spaced relation to and between the planes of the upper and lower edges thereof.

3. A heat accumulator for heating dishes containing food comprising a generally flat metal accumulator element adapted to be preheated and to be placed under the dish to be heated, and supports for the side edges of said accumulator element for supporting the element above the table and for supporting the dish above the element so as to provide an air space between the element and the table and between the dish and the element.

4. A heat accumulator for heating dishes containing food comprising a generally flat metal accumulator element adapted to be preheated and to be placed under the dish to be heated, and supports for the side edges of said element for supporting and insulating the same from the table to provide an air space between the table and the accumulator element and said element also having means for supporting a dish above the same so as to provide an air space between the element and the dish.

5. A device of the character described comprising a frame having an upwardly and outwardly flaring flange of substantial width, the angle of the flare of the flange being substantially equal to the angle of flare of a dinner plate and a heat accumulator supported in the frame in spaced relation to the upper and lower edges thereof.

6. A device of the character described comprising a frame and a heat accumulator, said heat accumulator having at least a portion of its edge grooved and a frame having a bead extended into said groove to support the heat accumulator in the frame.

7. A device of the character described comprising a frame and a heat accumulator, said heat accumulator being in spaced relation to the frame throughout the greater part of its periphery, but having extensions with grooved edges engaging said frame and supported thereby by a bead on said frame extending into said groove.

8. In an assembly of heat accumulators, a support having a closed bottom, a plurality of heat accumulator units superimposed on the support, a single electrical heating element extending through the several units and a cover on the topmost heat accumulator to assist in retaining heat from the heating element in the assembly.

NOAK VICTOR HYBINETTE.